United States Patent
Pind et al.

(10) Patent No.: US 9,562,181 B2
(45) Date of Patent: Feb. 7, 2017

(54) ADHESIVE FOR FILLING JOINTS AND GAPS IN ROTOR BLADES FOR WIND POWER PLANTS

(75) Inventors: Martin Pind, Suzhou (CN); Bodil Olsen, Skaevinge (DK)

(73) Assignee: SIKA TECHNOLOGY AG, Baar (CH)

( * ) Notice: Subject to any disclaimer, the term of this patent is extended or adjusted under 35 U.S.C. 154(b) by 708 days.

(21) Appl. No.: 13/997,307

(22) PCT Filed: Dec. 20, 2011

(86) PCT No.: PCT/EP2011/073411
§ 371 (c)(1),
(2), (4) Date: Jul. 18, 2013

(87) PCT Pub. No.: WO2012/084949
PCT Pub. Date: Jun. 28, 2012

(65) Prior Publication Data
US 2013/0294921 A1 Nov. 7, 2013

(30) Foreign Application Priority Data
Dec. 24, 2010 (EP) .................................. 10196963

(51) Int. Cl.
*C09J 175/00* (2006.01)
*C09J 175/04* (2006.01)
*C08G 18/32* (2006.01)
*C08G 18/36* (2006.01)
*C08G 18/42* (2006.01)
*C08G 18/48* (2006.01)
*C08G 18/66* (2006.01)
*C08G 18/76* (2006.01)
*C09J 175/06* (2006.01)
*C09J 175/08* (2006.01)
*F03D 1/06* (2006.01)
*C09J 175/12* (2006.01)
*F03D 3/06* (2006.01)

(52) U.S. Cl.
CPC .......... *C09J 175/04* (2013.01); *C08G 18/3243* (2013.01); *C08G 18/36* (2013.01); *C08G 18/4288* (2013.01); *C08G 18/4829* (2013.01); *C08G 18/4891* (2013.01); *C08G 18/6651* (2013.01); *C08G 18/6662* (2013.01); *C08G 18/6681* (2013.01); *C08G 18/6696* (2013.01); *C08G 18/7664* (2013.01); *C08G 18/7671* (2013.01); *C09J 175/06* (2013.01); *C09J 175/08* (2013.01); *C09J 175/12* (2013.01); *F03D 1/065* (2013.01); *F03D 1/0675* (2013.01); *F03D 3/062* (2013.01); *C08G 2190/00* (2013.01); *F05B 2230/80* (2013.01); *Y02E 10/721* (2013.01); *Y02P 70/523* (2015.11); *Y10T 403/477* (2015.01)

(58) Field of Classification Search
CPC C08G 18/4288; C08G 18/4891; C09J 175/04; C09J 175/12
See application file for complete search history.

(56) References Cited

U.S. PATENT DOCUMENTS

| 2006/0182957 | A1 | 8/2006 | Simons | |
|---|---|---|---|---|
| 2009/0253819 | A1* | 10/2009 | Reese | C08G 18/10 521/159 |
| 2010/0190016 | A1 | 7/2010 | Leberfinger et al. | |
| 2010/0297427 | A1* | 11/2010 | Schlingloff | C08G 18/3284 428/317.7 |

FOREIGN PATENT DOCUMENTS

| CN | 101421326 A | 4/2009 |
|---|---|---|
| CN | 101903433 A | 12/2010 |
| DE | 41 14 022 A1 | 11/1992 |
| DE | 10 2007 021 794 A1 | 11/2008 |
| WO | WO 2006/084900 A2 | 8/2006 |
| WO | WO 2009/080740 A1 | 7/2009 |

OTHER PUBLICATIONS

Anonymous, "Functional Products Sovermol® 805." Retrieved from the Internet: http://www.products.cognis.com/cognis/prodleafR2.nsf/($ProdcutsbyDocID_PL-Header)/REF33251C6E41933898C1256FE30050DCF5/$file/SOVERMOL_r_805_D.pdf.
International Search Report issued in International Patent Application No. PCT/EP2011/073411 dated May 7, 2012.
Jun. 30, 2015 Office Action in Chinese Patent Application No. 201180062638.2.
International Preliminary Report on Patentability issued in International Patent Application No. PCT/EP2011/073411 dated Jun. 25, 2013.

* cited by examiner

*Primary Examiner* — Michael L Leonard
(74) *Attorney, Agent, or Firm* — Oliff PLC

(57) ABSTRACT

The present invention relates to two-component polyurethane compositions which on the one hand have a long open time and, even after extended exposure to a climate with high atmospheric humidity (e.g., 70% relative humidity), even after 40 minutes and in particular even after 60 minutes, can still be glued and cured to form polymers having high mechanical strength. The composition comprises castor oil, at least one polyol having 5-8 hydroxyl groups, a mixture of two different polyether alcohols and/or polyester polyols on the basis of castor oil or soybean oil and at least one polyisocyanate. The two-component polyurethane compositions are suitable in particular for non-positive filling joints or gaps that are joined by large-surface area structural gluing, in particular of vane half shells of rotor blades for wind power plants.

20 Claims, No Drawings

ADHESIVE FOR FILLING JOINTS AND GAPS IN ROTOR BLADES FOR WIND POWER PLANTS

TECHNICAL FIELD

The invention relates to the field of two-component polyurethane adhesives, in particular structural two-component polyurethane adhesives and in particular the field of gluing and filling of joints and gaps of rotor blades for wind power plants.

PRIOR ART

Two-component polyurethane adhesives on the basis of polyols and polyisocyanates have long been used. Two-component polyurethane adhesives have the advantage that after mixing they also cure quickly with non-elevated ambient temperature ("cold curing") and therefore can quickly absorb greater forces after a short time. However, high demands are made in terms of strength and bond strengths of such adhesives for use as structural adhesives because such adhesives represent elements of load-bearing structures. High strengths are usually achieved by a high cross-linking density. This is usually achieved by increasing the concentration of functional groups and the use of higher-functional polyols or polyamines, and higher-functional polyisocyanates.

WO 2006/084900 A2 discloses a two-component polyurethane adhesive which can be used as a structural adhesive.

In particular for the production of rotor blades for wind power plants, where prefabricated vane half shells having a supporting framework structure and must be glued together in addition, the previous two-component polyurethane adhesives have the big problem that they need to have a long open time for the adhesive to be applied on a large surface, and the joining operation may take place with a time delay. The presence of high humidity leads to increased side reaction of the isocyanate groups in the isocyanate component with water. In this case, additional isocyanate groups are consumed, which are no longer available to set up a crosslinked polyurethane. Furthermore, it may lead to foaming of the adhesive by carbon dioxide evolution. Subsequently, with high humidity as can be observed in usual seasonal fluctuations or due to climatic characteristics at the processing site, on the one hand the reaction of the adhesive with humidity can greatly shorten the open time of the adhesive and, on the other, deteriorate sharply the mechanical properties of the cured adhesive.

WO 2009/080 740 A1 discloses a two-component polyurethane adhesive which is suitable for the gluing of fiber elements and characterized by the combination of a high molecular weight polyester diol, a high-functional polyol, a hydrophobic polyol and further auxiliary substances. However, these adhesives have high rigidity with values for the modulus of elasticity of more than 2,000 MPa and could be improved in particular in the mechanical properties in terms of improving the mechanical toughness.

When gluing the prefabricated vane half shells having a supporting framework structure, joints arise inevitably. Moreover, after prolonged use of a structurally glued rotor blade, in the component itself or in the area of adhesive joints stress cracks may form that are visible as gaps on the surface. In order to fill these joints and gaps an adhesive must be used, as described above, having a long open time and high mechanical strength combined with a certain amount of elasticity in terms of a tough and resilient modified material.

SUMMARY OF THE INVENTION

The object of the present invention is therefore to provide two component-term polyurethane compositions having on the one hand a long open time and after application to a substrate and after extended exposure to a high-humidity climate (e.g., 70% relative humidity), even after 40 minutes, and in particular even after 60 minutes, can still be joined (glued) and cure to form polymers having a certain degree of elasticity (5-15% elongation at break) combined with a high tensile strength (>15 MPa).

Surprisingly, it has now been found that a two-component polyurethane composition according to claim 1 is capable of solving this problem.

It was found that these compositions due to their mechanical properties are ideally suited for filling joints and gaps in structural gluing of large-surface are molded bodies, in particular of rotor blade half shells in the construction of wind power plants. In particular, it was found that the adhesives of the invention have a particularly good balance between elongation at break and tensile strength in terms of a elastically modified material.

Other aspects of the invention are the subject of further independent claims. Particularly preferred embodiments of the invention are subject of the dependent claims.

Ways of Carrying Out the Invention

The present invention relates to a two-component polyurethane composition consisting of a polyol component (K1) and a polyisocyanate component (K2).

In this context, the polyol component (K1) comprises
castor oil (A0);
at least one polyol having 5-8 hydroxyl groups (A1);
at least one polyether and/or polyester polyol on the basis of castor oil or soybean oil having an OH number of 150 to 200 mg KOH/g (A2-1), and
at least one polyether and/or polyester polyol on the basis of castor oil or soybean oil having an OH number of 210-300 mg KOH/g (A2-2).

In this context, the polyisocyanate component (K2) comprises at least one polyisocyanate (B1).

The prefix "poly" in substance names such as "polyol", "polyisocyanate", "polyether" or "polyamine" refers in the present document to the fact that the substance formally contains more than one functional group that occurs in its name per molecule.

In the present document, gaps refer to cracks of the structurally glued rotor blades that are visible on the surface.

The polyol component (K1) comprises castor oil (A0). Castor oil is a naturally renewable resource and is obtained from the seeds of the castor shrub (*Ricinus communis*, spurge family). Castor oil is essentially a triglyceride. The ricinoleic acid has secondary hydroxyl groups. Accordingly, castor constitutes a hydrophobic polyol. Castor oil can be used raw or purified. Particularly suitably, castor oil is used with a reduced content of free fatty acids (low FFA castor oil). Preferably, castor oil is used having a free fatty acid content of less than 5 wt-%, in particular between 1 and 4 wt-%.

The use of castor oil as a renewable natural product in industrial products is ecologically very valuable and therefore very advantageous.

It is advantageous if the proportion of castor oil (A0) in the polyol component (K1) is between 5 and 30 wt-%, in particular between 10 and 25 wt-%, preferably between 14 to 20 wt-%.

The polyol component (K1) comprises at least one polyol having 5 to 8 hydroxyl groups (A1). In the adhesives industry such high-functional polyols are usually used relatively rarely as polyols, as they have a strong cross-linking effect and therefore result in embrittlement in most systems after curing. Particularly suitable are sugar alcohols, and sugar alcohol-based polyols having a corresponding number of —OH groups, particularly pentols and hexyls, or those on the basis of disaccharides. The corresponding sugars can be used also, in particular, however, these are the hydrogenated sugar alcohols. Examples are sorbitol, inositol, mannitol, adonitol, ribitol, xylitol, dulcitol, glucose, galactose, mannose, allose, altrose, gulose, idose, talose, fructose, sorbose, psicose, sucrose, lactose, trehalose, maltose, cellobiose, melibiose and rutinose. The corresponding ethoxylation and propoxylation products having up to 15 alkylene oxide units can be used also.

The molecular weight of such polyols having 5 to 8 hydroxyl groups (A1) may be 120-3000 g/mol, in particular from 250 to 2000 g/mol.

Polyether polyols can be used also. Examples are reaction products of 5 to 6 functional alcohols that can be prepared by reaction with ethylene oxide or propylene oxide.

Another group of suitable polyether polyols are the polytetramethylene glycols, in particular poly(THF)diols, which, for example, can be produced by the acidic polymerization of tetrahydrofuran. Here, the molecular weight of these polyether polyols is generally between 200 and 6000 g/mol, preferably in the range of 400 to 3000 g/mol.

Due to the high number of the reactive OH groups the polyols having 5 to 8 hydroxyl groups (A1) have in a higher polarity. Therefore, they are also at least partially miscible with water.

The polyol having 5 to 8 hydroxyl groups (A1) is preferably based on sorbitol. Particularly preferably, the polyol having 5-8 hydroxyl groups (A1) has only secondary hydroxyl groups.

It is advantageous if the proportion of the polyol having 5 to 8 hydroxyl groups (A1) in the polyol component (K1) is between 5 and 30 wt-%, in particular between 0.5 and 20 wt-%, preferably 1-10 wt-%.

The polyol component (K1) comprises at least one polyether and/or polyester polyol on the basis of castor oil or soybean oil having an OH number of 150 to 200 mg KOH/g (A2-1). An OH number of 155 to 190 mg KOH/g is preferred. Furthermore, it preferably has an OH equivalent weight of 300 to 400 g/eq.

As such polyether and/or polyester polyols (A2-1) reaction products of castor oil with ketone resins are preferred, in particular those which are sold, for example, by Bayer under the name Desmophen® 1150 and Cognis under the name Sovermol® 805.

The polyol component (K1) comprises at least one polyether and/or polyester polyol on the basis of castor oil or soybean oil having an OH number of 210 to 300 mg KOH/g (A2-2). An OH number of 215 to 270 mg KOH/g is preferred. Furthermore, it preferably has an OH functionality between 2.5 and 3, in particular between 2.6 and 2.9.

As such polyether and/or polyester polyols (A2-2) reaction products of castor oil with ketone resins are preferred.

It is important here to realize that the presence of both polyol (A2-1) and (A2-2) is necessary to achieve the advantageous properties. Advantageously, the weight ratio of polyol (A2-1) Polyol (A2-2) is between 8 and 1, in particular between 5 and 1.5, preferably between 2 and 3

Furthermore, it is preferred that the polyol component (K1) further contains at least one polyamine (PA) in an amount of 0.5 to 5 wt-%, preferably from 1.5 to 2.5 wt-%.

Suitable polyamines (PA) are polyamines customarily used in polyurethane chemistry, in particular diamines. However, particularly suitable are more hydrophobic polyamines, in particular aromatic polyamines. Particularly preferred polyamines (PA) are aromatic diamines having the formula (II):

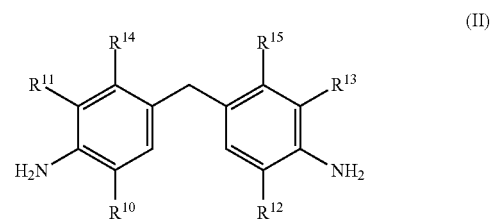

Here, $R^{10}$, $R^{11}$, $R^{12}$ and $R^{13}$ each represent H or a linear or branched $C_1$ to $C_4$ alkyl group, provided that $R^{11}$ and $R^{13}$ are not simultaneously representing H. Furthermore, $R^{14}$ and $R^{15}$ each represent H or a chlorine atom.

Particularly preferred are 4,4'-methylene-bis-(3-chloro-2,6-diethyl) aniline, 4,4'-methylene-bis-(3-chloro-2,6-diethylaniline), 4,4'-methylene-bis-(2,6-diethylaniline), 4,4'-methylene-bis-(2,6-diisopropylaniline), and 4,4'-methylene-bis-(2-isopropyl-6-methylaniline).

Such aromatic polyamines are preferred over other aromatic polyamines because these are toxicologically favorable aromatic polyamines.

Particularly preferably, the polyamine (PA) is 4,4'-methylene-bis-(2,6-diethylaniline).

Furthermore, the polyol component (K1) may comprise other components. Advantageously, curing catalysts are employed. Such catalysts are known to the person skilled in the art for the reaction of polyisocyanates with polyols, optionally also for the reaction with polyamines or water. Examples of such catalysts include tin, zinc and bismuth-organic metal catalysts, such as dibutyltin dilaurate, or tertiary amines, e.g. 1,4-diazobicyclo-[2.2.2]-octane (DABCO).

Through the selection and concentration of appropriate polyamines (PA), and catalysts the pot life and curing behavior and the viscosity of the mixture of the components (K1 and K2) and the stability, respectively, of the applied adhesive can be influenced favorably.

Particularly preferred are two-component polyurethane compositions comprising a polyol component (K1), containing:

10-25 wt-% of castor oil (A0);
1-10 wt-% of a polyol having 5-8 hydroxyl groups (A1);
1-40 wt-% of a polyether and/or polyester polyol on the basis of castor oil or soybean oil having an OH number of 150 to 200 mg KOH/g (A2-1)
1-30 wt-% of polyether and/or polyester polyol on the basis of castor oil or soybean oil having an OH number of 210 to 300 mg KOH/g (A2-2).

The polyisocyanate component (K2) comprises at least one polyisocyanate (B1).

Particularly suitable polyisocyanates (B1) are on one hand polyisocyanates (B1'), which, in addition to two or more free isocyanate groups, have at least one urea or one urethane or one biuret or one uretdione group.

Preferably, the polyisocyanate (B1) is an aromatic polyisocyanate. Particularly suitable are diphenylmethane diisocyanate (2,4'- and/or 4,4'-MDI) and MDI-based polyisocyanates. Particularly suitable on the one hand are polyisocyanates of the type as they are commercially available from Bayer as Desmodur® VH 20 by. Furthermore, suitable polyisocyanates (B1') are isocyanurates or biurets of a diisocyanate, in particular of HDI and/or IPDI and/or TDI.

It is quite possible to use mixtures of polyisocyanates B1'.

In a preferred embodiment, a mixture of mono- and multinuclear MDI (so-called polymeric MDI) is used. A particularly preferred polyisocyanate (B1) is Desmodur® VKS 20 F from Bayer.

On the other hand, particularly suitable as polyisocyanate (B1) are polyurethane polymers (B1") having at least two isocyanate groups, and which are formed in a reaction of at least one polyisocyanate having a molecular weight of less than 300 g/mol, in particular between 150 g/mol and 270 g/mol, with at least one polyol (AB1). Particular suitable as polyol (AB1) are polyols selected from the group comprising polyether polyols, polyester polyols, polycarbonate polyols, polyols which are formed from unsaturated monomers and mixtures thereof. The production of such isocyanate groups-containing polyurethane prepolymers is carried out in a known manner and is typically carried out in stoichiometric excess of the polyisocyanate to the polyol. Polyisocyanates used for this purpose are in particular 2,4- and 2,6-toluoylene diisocyanate (TDI), 2,4'- and 4,4'-diphenylmethane diisocyanate (MDI), 1,6-hexamethylene diisocyanate (HDI) as well as their isomers and mixtures with one another. MDI is considered as being particularly preferred.

Polyether polyols, also called polyoxyalkylenepolyols, are considered polymerization products of ethylene oxide, 1,2-propylene oxide, 1,2- or 2,3-butylene oxide, tetrahydrofuran or mixtures thereof, optionally they are polymerized using an initiator having two or more active hydrogen atoms such as water, ammonia, or compounds having two or more OH or NH groups such as 1,2-ethanediol, 1,2- and 1,3-propanediol, neopentyl glycol, diethylene glycol, triethylene glycol, the isomeric dipropylene and tripropylene glycols, the isomeric butanediols, pentanediols, hexanediols, heptanediols, octanediols, nonanediols, decanediols, undecanediols, 1,3- and 1,4-cyclohexane dimethanol, bisphenol A, hydrogenated bisphenol A, 1,1,1-trimethylolethane, 1,1,1-trimethylolpropane, glycerol, aniline, and mixtures of the aforementioned compounds. Both polyoxyalkylene polyols having a low degree of unsaturation (measured according to ASTM D-2849-69 and expressed in milliequivalent unsaturation per gram of polyol (meq/g)), produced for example with the aid of double metal cyanide complex catalysts (DMC catalysts), and polyoxyalkylene polyols having a high degree of unsaturation, produced for example with the aid of anionic catalysts such as NaOH, KOH or alkali, can be used.

Particularly suitable are polyoxyalkylene diols or polyoxyalkylene triols, in particular polyoxypropylene dials or polyoxypropylene triols.

Especially suitable are polyoxyalkylene diols or polyoxyalkylene triols having a degree of unsaturation of less than 0.02 meq/g and having a molecular weight in the range of 1,000 to 30,000 g/mol, and polyoxypropylene dials and triols having a molecular weight of 400 to 8000 g/mol. In the present document, the term "molecular weight" or "mol weight" is understood to mean always the number-average molecular weight $M_n$.

Also particularly useful are so-called "EO-endcapped" (ethylene oxide-endcapped) polyoxypropylene diols or triols. The latter are special polyoxypropylene polyoxyethylene polyols, which are obtained, for example, by alkoxylation of pure polyoxypropylene polyols after completion of the polypropoxylion with ethylene oxide, thus having primary hydroxyl groups.

Polyester polyols are in particular polyols, which are produced, for example, from two to trivalent alcohols such as 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylol propane or mixtures of the aforementioned alcohols, and organic dicarboxylic acids or their anhydrides or esters such as, for example, succinic acid, glutaric acid, adipic acid, suberic acid, sebacic acid, dodecane dicarboxylic acid, maleic acid, fumaric acid, phthalic acid, isophthalic acid, terephthalic acid and hexahydro phthalic acid or mixtures of the aforementioned acids, and polyester polyols formed from lactones such as ϵ-caprolactone.

Particularly preferred polycarbonate polyols are those which are available by reaction of the above alcohols—which were used to synthesize the polyester polyols—with dialkyl carbonates, diaryl carbonates or phosgene.

"Polyols formed from unsaturated monomers" are understood to be in particular such polyols which is are produced by the polymerization of at least one of the monomers selected from the group consisting of ethylene, propylene, butylene, butadiene, isoprene, styrene, vinyl alcohol, vinyl ether, vinyl ester, acrylonitrile, acids, amides and esters of acrylic acid, methacrylic acid, maleic acid, fumaric acid, crotonic acid and itaconic acid, and mixtures thereof are.

Particularly suitable polyols formed from unsaturated monomers are hydroxy-terminated polybutadienes such as polybutadiene polyols and hydrogenated polybutadiene polyols, and poly(meth)acrylate polyols. Here and hereinafter in this document "(meth)acrylate" is always understood to mean both esters of acrylic acid and methacrylic acid. Also, "(meth)acrylic acid" refers to both acrylic acid and methacrylic acid.

In this context, "poly(meth)acrylate polyols" are understood to mean polymers which are copolymers of a hydroxyfunctional (meth)acrylic acid ester and at least one further monomer which is selected from the group consisting of the monomers acrylic acid, methacrylic acid, $C_1$-$C_{18}$ alkyl esters of acrylic acid or methacrylic acid, styrene, vinyl ester and vinyl alcohol. As hydroxy-functional (meth)acrylic acid ester hydroxyethyl (meth)acrylate, hydroxypropyl (meth)acrylate and hydroxybutyl (meth)acrylate are preferred.

Said polyols (AB1) preferably have an average molecular weight of 250 to 30,000 g/mol, in particular from 1,000 to 8,000 g/rnol, and are preferably diols or triols, in particular having an average OH functionality ranging from 1.6 to 3.

In a preferred embodiment, a mixture of polyols (AB1) is used which is a mixture of diols and triols.

In one embodiment of the invention, the polyisocyanate component (K2) comprises at least one polyisocyanate (B1') and at least one polyisocyanate polyurethane prepolymer (B1").

In addition to the already mentioned components, the polyol component (K1) and/or the polyisocyanate component (K2) may include other components, as known by the skilled person from two-component polyurethane chemistry. These may be present in only one component or in both. As additional components are used, for example, solvents, plasticizers and/or extender fillers, such as carbon blacks, chalks or talcs, adhesion promoters, in particular trialkoxysilanes, and thixotropic agents, such as amorphous silica, and desiccants such as zeolites.

As the person skilled in the art of polyurethane adhesives knows, care must be taken in the production of the components, in particular the polyisocyanate component (K2), to ensure that the raw materials are preferably free from water and that during and after their production preferably no moisture can enter into contact with said component. This is achieved either by physical or chemical drying of the starting materials and by working under inert gas, usually nitrogen, or by working under vacuum.

Advantageously, the components (K1, K2) are formulated such that the volume ratio of polyol component (K1) and polyisocyanate component (K2) is between 1:3 and 3:1, in particular between 1:2 and 2:1. Particularly preferably, this ratio is about 1:1. Preferably, the mixing ratio is such that the NCO groups of the polyisocyanate component (K2) are stoichiometric to the NCO-reactive groups, typically OH groups, of the polyol component (K1). If said mixing is not performed substantially stoichiometric, i.e., varying by more than 5%, the reaction of the polyol component (K1) and the polyisocyanate component (K2) is not optimal, which leads to a reduction in the mechanical properties of the cured polyurethane composition. This is in particular true for an excess of polyol component. The presence of an excess of polyisocyanate is basically also disadvantageous, but by the subsequent reaction of the unreacted isocyanate groups with moisture, for example, from humidity, which potentially can lead to further crosslinking, defects in the polyurethane network structure and resulting deteriorating mechanical properties are at least partially compensated.

Prior to use, the polyol component (K1) and polyisocyanate component (K2) are stored separately from one other, and are mixed with one another only during or immediately before use. Advantageously, the components are present in a package which consists of two chambers which are separated from one another, and in such a manner that the polyol component (K1) is present in one of said chambers, and the polyisocyanate component (K2) in the other of said chambers. The polyol component (K1) and isopolycyanate component (K2) are filled into said chambers of the package and sealed air- and moisture-tight.

Preferred packages of this kind are on the one hand side-by-side double cartridges or co-axial cartridges, in which two tubular chambers are arranged next to one another or into one another and are sealed air- and moisture-tight by a plunger. On advancing said plungers, the components can be pressed out of the cartridge. The sides of the tubes opposite to said plungers, are modified, optionally via an adapter, in such a way that in the area of the opening, the chamber openings are directly connected by a partition wall. Advantageously, a thread is mounted in the area of the exit opening of the chambers so that a static mixer or dynamic mixer can be mounted tightly. Such packages are preferred, particularly for small applications, in particular for loads of up to 1 liter.

For larger applications, in particular for applications in industrial manufacture, the polyol component (K1) and polyisocyanate component (K2) are advantageously filled and stored in drums or pails. In this case, the components are squeezed out by hydraulic presses, in particular via follower plates, and via pipes fed to a mixing apparatus, such as are typically used for two-component adhesives in industrial manufacture.

For any package, it is important that at least the polyisocyanate component (K2) is sealed air- and moisture-tight so that the two components can be stored for a long period of time, i.e., typically longer than 6 months.

The two-component polyurethane composition is preferably flowable, but can also exhibit thixotropic properties in particular. The cured two-component polyurethane composition has high mechanical strength, particularly high values for tensile strength (in the present document, the value of the tension at the break point is used always); measured directly after joining according to ISO 527-2 it has values of more than 12 MPa, preferably of more than 15 MPa, and most preferably of more than 20 MPa. Typically, however, this tensile strength is less than 40 MPa. Furthermore, the cured two-component polyurethane composition has an elongation at break, measured according to ISO 527-2, in particular of between 5 and 15%, preferably between 8 and 12%.

Thus, the cured two-component polyurethane composition has a very high mechanical strength, allowing to use the two-component polyurethane composition as an adhesive for structural gluing and filling of joints and gaps in structural gluing, in particular of rotor blades for wind power plants.

In another aspect, the invention relates to a method for non-positively filling joints and gaps in a substrate, comprising the steps of:
a) mixing said polyol component (K1) and said polyisocyanate component (K2) of a two-component polyurethane composition, as described in detail above,
b) applying said mixed polyurethane composition in the joint to be bridged between two substrates, or in the gap to be filled at the surface of a substrate,
c) curing the polyurethane composition in the joint or gap.

These steps are carried out in the order listed.

Said mixing is typically carried out by static mixers or by means of dynamic mixers. When mixing, care must be taken to ensure that preferably the two components are mixed homogeneously. If the two components are mixed incompletely, there will be local deviations from the optimum mixing ratio, i.e. essentially the optimum stoichiometry, which will result in a deterioration of the mechanical properties of the cured polyurethane composition. To evaluate the mixing quality visually, it is advantageous when the polyol component (K1) and the polyisocyanate component (K2) have two different colors which may be distinguished well from of one other visually, but also from the mixture. An example of such a color combination is when one of said components is black and the other is white. A good mixing is present, when a homogeneous gray color is present and that there are no stripes or patterns in light or dark gray or white or black.

The mixed polyurethane composition is applied into a joint. Such joints are unavoidable in the large-surface area gluing of molded bodies. Inter cilia, one reason for this is the dimensional tolerances of large substrates. The polyurethane composition must be able to fill up the joint as much as possible and non-positively joins the parts. The same applies to the filling of gaps, which after extended use of a structurally glued rotor blade are visible as gaps on the surface in the component itself or in the area of adhesive joints due to the formation of stress cracks.

The composition may be injected into the joint or gap by means of a nozzle or filled in by means of a spatula. Accordingly, it is advantageous that the adhesive has a certain shape consistency. In this context, it should not be too highly fluid nor too highly viscous. It has been found to be optimal that the mixed polyurethane composition has a pasty consistency similar to putty, and is stable and beneficially shear thinning, i.e. manually spreadable. In order not to have to use too much mixed polyurethane composition or to have to remove too much applied polyurethane composition later on, advantageously the edges of the joint or gap can be covered with a masking tape or a temporary adhesive foil.

The substrate forming the gap to be bridged is preferably a metal, plastic, glass or ceramic or fiber composite material. It is possible that two different substrates are provided which are glued together. It is possible for the part to be joined, i.e. the second substrate to be identical with or different from the first substrate.

The filling typically occurs after the adhesive that was used for joining the two substrates, is already cured.

After curing of the polyurethane composition used for the filling, the composite piece, the joints or gaps of which are filled, can be mechanically reworked. This includes in particular sanding and grinding. Reworking ensures that the final shape, particularly the optimum spatial shape is obtained. The existence of an optimal spatial shape and surface texture is particularly important in the manufacture of rotor blades for wind power plants because it has a great influence on the aerodynamic properties and thus directly on the efficiency of the rotor blades, so that the existence of an optimal spatial shape and surface texture directly affects the amount of mechanical energy recovered from the wind and also indirectly the electrical energy. Thus, this is an important economical and ecological factor.

The preferred substrate is a plastic, in particular a fiber-reinforced plastic.

Such fiber-reinforced plastic is a composite material comprising fibers embedded in a matrix consisting of plastic.

Suitable fibers of such fiber-reinforced plastics are fibers which are selected from the list consisting of inorganic fibers, in particular glass fibers and ceramic fibers; and organic fibers. Preferably, the organic fibers are aramid fibers, polyester fibers, nylon fibers, plexiglass fibers, fibers of a homo or copolymer of ethylene and/or propylene, natural fibers, textile fibers, and carbon fibers. Most preferred are carbon fibers.

In this context, the fibers can be short or long fibers, spun, woven or non-woven fibers or filaments. Furthermore, the fibers can be oriented or stretched fibers. Furthermore, it may be advantageous to use different fibers, both in geometry and also in composition. The fibers are used as woven fabrics, laid webs or knitted fabrics or mats or rovings. In this case, the intermediate spaces existing between the fibers are filled with a plastic matrix. Suitable plastic matrices are selected from the list consisting of epoxy resin, unsaturated polyester resin, vinyl ester resin, phenol-formaldehyde resin, diallyl phthalate resin, (meth)acrylate resin, polyurethane, amino resins, melamine resin and urea resin. As the plastic matrix an epoxy resin is particularly preferred.

A particularly preferred substrate to be glued is a molded part on the basis of glass fibers and/or carbon fibers in a polyester or polyepoxide matrix. Such molded parts can be produced by various processes in a known manner from a polyester or polyepoxide, and glass fibers and/or carbon fibers. Such molded parts are used, for example, in aircraft construction, in boat building or other mechanically highly stressed components. A particular area of application of such glued substrates are rotor blades for wind power plants. The manufacturing methods for such molded parts are also well known to the person skilled in the art.

Such rotor blades for wind power plants are produced and cured in molds, for example. The mold is often designed as a half shell. The shape of the side facing the mold is generally obtained having a smooth surface ready to use, the other side typically can and is intended to be processed. In this case, two or more of these substrates are glued together in the further production of the vanes. In addition, the vanes are mechanically reinforced by the incorporation of a supporting framework structure. Here, the adhesive is ensuring the connection of half shell profiles and the supporting framework structure. Generally, the side facing away from the mold is used as the side to be glued. The surface should be formed preferably in such a way that the substrate parts to be glued approximately have a fit. The surface intended for gluing may be rough and uneven in itself. A grinding or milling to form a shape that is an exact mirror image to the counterpart to be glued, is not necessary. A dust and grease free surface area is sufficient for applying the adhesive, the use of primers is not required.

One known method of operation is such that the surfaces at the outer side of the molded parts following the production of parts in the shape for crosslinking are covered with a protective tear-resistant fabric. This can be completely removed immediately before the later gluing and thus yield a suitable surface. It is also possible to process such surfaces mechanically rough and adapt to the corresponding counterpart. Then, the adhesive can be applied on the surfaces of substrates prepared in such a way and freed of loose parts and dust. The remaining joints between the mold parts joined by gluing, or gaps are then filled with the two-component polyurethane composition, as previously described.

The two-component polyurethane composition can, however, be used quite well as adhesive due to its mechanical properties.

Therefore, a method for gluing is also an aspect of the present invention. This method comprises the steps of:
a') mixing the polyol component (K1) and the polyisocyanate component (K2) of a two-component polyurethane composition, as described in detail above.
b') applying the mixed polyurethane composition to at least one surface of the substrates to be glued,
c') joining within the open time,
d') curing the polyurethane composition.

The two-component polyurethane composition described has an open time which is particularly suitable for the gluing of large parts to be joined or molded parts or filling joints and gaps of large parts to be joined or molded parts. The open time describes that period of time within which, after mixing the two components and subsequent application of the adhesive joining of the substrate parts is still possible, before the adhesive has reacted to such an extent, that it is no longer capable to build an adhesive bond.

Using the cured compositions of the invention, glass transition temperatures, measured according to ISO 11357, of more than 50° C., in particular greater than 55° C. may be obtained.

Typically, the two-component polyurethane composition at room temperature and 50% relative humidity has an open time greater than 60 minutes, in particular between 60 minutes and 4 hours.

It is a particularly big advantage of the present invention that the open time even with large humidity, for example, 70% relative humidity, is of long duration, i.e., at least 60 minutes. But this is very surprising to the person skilled in the art because of the known reactivity of isocyanates towards water in particular from humidity.

This feature allows to implement reliably large-surface area gluings or fillings of joints or gaps of large molded parts such as occur for example in factories during the construction of rotor blades for wind power plants or in the repair of gaps on site, largely independent of the humidity. Here, it is of course important that due to the high humidity, the mechanical properties are not affected too strongly negative.

From the previously described method there results an article, which represents in particular a rotor blade for wind power plants.

The previously described two-component polyurethane composition can therefore be used especially well as an adhesive, particularly as a structural adhesive, in particular as a force-transmitting structural element in the construction of rotor blades for wind power plants. Typical examples of applications of such adhesives are found in buildings, automobiles, vehicles or ships or wind power plants. Here, the cured adhesive is part of a supporting structure and thus forms an important link with high requirements to its mechanical properties. The present invention meets these high requirements perfectly.

The previously described two-component polyurethane composition is particularly well suited for use as filler for joints or gaps, in particular as a non-positively filling material in the construction or repair of rotor blades for wind power plants.

EXAMPLES

The following examples are intended to illustrate the present invention: However, the examples should not be considered as limiting the invention.

The compositions 1 exemplified in Table 1, and Ref. 1 to Ref. 4 as reference examples all have the same component K2.

For the preparation of the components K1, the polyol mixture was charged into a vacuum dissolver and following the addition of catalyst and desiccant stirred for 20 minutes at 25° C. with exclusion of moisture. Subsequently, these polypol components K1 were filled in air- and moisture-tight cartridges.

For component K2, the polyisocyanate component B1 was filled into an air- and moisture-tight cartridge.

Components K1 and K2, at the weight ratio K1:K2 as indicated in Table 1, were mixed by means of a static mixer (corresponding to an NCO/OH ratio of 1.1).

Measurements

Modulus of Elasticity, Tensile Strength and Elongation at Break

The mixed components K1 and K2 were mixed, and immediately after mixing dumbbells according to ISO 527, part 2, 1B (ISO 527-2) were prepared; they were cured for 24 h at 25° C. and then for 72 h at 60° C. After a conditioning time of 24 h at 25° C., tensile strength, modulus of elasticity and elongation at break of the specimens thus prepared were measured in accordance with ISO 527-2 on a Zwick Z020 tensile tester at a test temperature of 20° C. and a test speed of 2 mm/min.

Tensile Shear Strength

The mixed components K1 and K2 were mixed and applied on the first plate of glass fiber-reinforced epoxy (GRE). This was followed immediately or after 40 or 60 minutes after exposure ($t_{exp}$) at 25° C. and 70% relative humidity further with the production of the tensile shear strength specimen (contacting with a second glass glass fiber-reinforced epoxy plate, pressing, adhesive thickness 2 mm). The adhesive was then cured for 24 h at 25° C. and then for 72 h at 60° C., and the tensile shear strength was determined in accordance with ISO 527 following a conditioning time of 24 h at 25° C.

TABLE 1

Compositions and measuring results.

| | | Examples | | | | |
|---|---|---|---|---|---|---|
| | | 1<br>A1<br>(pbw³) | Ref. 1<br>Ref. A1<br>(pbw³) | Ref. 2<br>Ref. A2<br>(pbw³) | Ref. 3<br>Ref. A3<br>(pbw³) | Ref. 4<br>Ref. A4<br>(pbw³) |
| Component K1 | | | | | | |
| Castor oil | A0 | 16 | 16 | 16 | 16 | |
| Polyether polyol on the basis of sorbitol having 6 hydroxyl groups (hydroxyl number 490 mg KOH/g) | A1 | 8 | 8 | | 8 | 8 |
| Sovermol ® 805 | A2-1 | 31.1 | 31.3 | 31.3 | | 31.3 |
| Polyol² | A2-2 | 13 | | 13 | 13 | 13 |
| Zeolite (desiccant) | | 6 | 6 | 6 | 6 | 6 |
| Chalk | | 22 | 22 | 22 | 22 | 22 |
| Pyrogenic silica | | 1.5 | 1.5 | 1.5 | 1.5 | 1.5 |
| 4,4'-Methylene-bis-(2,6-diethylaniline) | PA | 2.2 | 2.2 | 2.2 | 2.2 | 2.2 |
| | | 100 | 87 | 92 | 68.7 | 84 |
| Component K2 | | | | | | |
| Desmodur ® VKS20F | B1 | 100 | 100 | 100 | 100 | 100 |
| Mixing ratio K1/K2 (wt/wt) | | 100/<br>40 | 100/<br>36.4 | 100/<br>32.1 | 100/<br>37.3 | 100/<br>39.5 |
| Tensile strength [MPa] | | 21.5 | 28.2 | 12.2 | 25.6 | 30.8 |
| Elongation at break [%] | | 12.6 | 9.6 | 49.8 | 3.4 | 4.3 |
| Modulus of elasticity [MPa] | | 764 | 1321 | 50 | 1069 | 1242 |
| $t_{exp}$: 0 min<br>(25° C., 70% rel. hum¹) | | | | | | |
| Tensile shear strength [MPa] | | 18.1 | 12.8 | 13.2 | 14.8 | 15.5 |
| $t_{exp}$: 40 min<br>(25° C., 70% rel. hum¹) | | | | | | |
| Tensile shear strength [MPa] | | 15.2 | 7.8 | 12.3 | 7.6 | 6.5 |
| $t_{exp}$: 60 min<br>(25° C., 70% rel. hum¹) | | | | | | |
| Tensile shear strength [MPa] | | 12.0 | 1.2 | 11.9 | 0.6 | 1.3 |

¹rel. hum = relative humidity
²Polyester/polyether on the basis of castor oil with OH number of 220-260 mg KOH/g, functionality: 2.8
³pbw = parts by weight The comparison of Example 1 and Ref. 2 shows that the absence of the polyol having 5 to 8 hydroxyl groups leads to an unduly strong reduction of the tensile strength and a significant increase in elongation at break. Surprisingly, the tensile shear strength also deteriorated significantly.

The comparison of Example 1 and Ref. 1 shows the importance of the simultaneously present polyether and/or polyester polyol on the basis of castor oil or soybean oil (A2-1) and (A2-2). In the absence of said polyether and/or polyester polyol on the basis of castor oil having a high hydroxyl number, the tensile shear strength deteriorates unexpectedly dramatic after extended open times, in particular after 60 minutes in humid air.

Also in Ref. 3 and Ref. 4, the tensile shear strength deteriorates unexpectedly dramatic after extended open times, in particular after 60 minutes in humid air.

Example 1 shows that using the composition of the invention on the one hand, a good balance between the elongation at break and tensile strength necessary for fillers can be achieved, and on the other hand, that even after extended exposure of the applied polyurethane composition in moist air, a reliable formation of adhesion and thus non-positive tight fit at the interface between filler and the substrate can be achieved.

The invention claimed is:

1. A two-component polyurethane composition consisting of a polyol component and a polyisocyanate component; wherein
the polyol component comprises:
10-15 wt-% of castor oil,
1-10 wt-% of at least one polyol having 5-8 hydroxyl groups,
1-40 wt-% of at least one polyether and/or polyester polyol on the basis of castor oil or soybean oil having an OH number of 150 to 200 mg KOH/g, and
1-30 wt-% of at least one polyether and/or polyester polyol based on castor oil or soybean oil with an OH number of 210-300 mg KOH/g; and
the polyisocyanate component comprises at least one polyisocyanate.

2. The two-component polyurethane composition according to claim 1, wherein the polyol having 5 to 8 hydroxyl groups is a polyol having exclusively secondary hydroxyl groups.

3. The two-component polyurethane composition according to claim 1, wherein the polyol having 5-8 hydroxyl groups is a polyether polyol on the basis of sorbitol.

4. The two-component polyurethane composition according to claim 1, wherein the polyisocyanate is an aromatic polyisocyanate.

5. The two-component polyurethane composition according to claim 1, wherein the polyol component further contains a polyamine in an amount of 0.5 to 5 wt-%.

6. A method for non-positive filling joints and gaps in a substrate, comprising the steps of
a) mixing said polyol component and said polyisocyanate component of a two-component polyurethane composition according to claim 1,
b) applying said mixed polyurethane composition in the joint to be bridged between two substrates, or in the gap to be filled at the surface of a substrate,
c) curing the polyurethane composition in the joint or gap.

7. A method of gluing, comprising the steps of
a') mixing the polyol component and the polyisocyanate component of a two-component polyurethane composition according to claim 1,
b') applying the mixed polyurethane composition to at least one surface of the substrates to be glued,
c') joining within the open time,
d') curing the polyurethane composition.

8. The method according to claim 6, wherein substrate forming the gap to be bridged is plastic.

9. An item, which was obtained by a method according to claim 6.

10. The item according to claim 9, wherein the item is a rotor blade for wind power plants.

11. A method comprising:
adhering a structure with the two-component polyurethane composition according to claim 1.

12. A method comprising:
non-positively filling joints or gaps with a two-component polyurethane composition according to claim 1.

13. The method according to claim 11, wherein the two-component polyurethane composition is a force-transmitting structural element in the construction of rotor blades for wind power plants.

14. The method according to claim 6, wherein the substrate forming the gap to be bridged is fiber-reinforced plastic.

15. The two-component polyurethane composition according to claim 1, wherein a volume ratio of the polyol component to the polyisocyanate component is between 1:3 and 3:1.

16. The two-component polyurethane composition according to claim 1, wherein a volume ratio of the polyol component to the polyisocyanate component is between 1:2 and 2:1.

17. The method according to claim 6, wherein a volume ratio of the polyol component to the polyisocyanate component is between 1:3 and 3:1.

18. The method according to claim 6, wherein a volume ratio of the polyol component to the polyisocyanate component is between 1:2 and 2:1.

19. The method according to claim 7, wherein a volume ratio of the polyol component to the polyisocyanate component is between 1:3 and 3:1.

20. The method according to claim 7, wherein a volume ratio of the polyol component to the polyisocyanate component is between 1:2 and 2:1.

* * * * *